US009552481B1

(12) United States Patent
Guo (10) Patent No.: US 9,552,481 B1
(45) Date of Patent: Jan. 24, 2017

(54) SYSTEMS AND METHODS FOR MONITORING PROGRAMS

(71) Applicant: Symantec Corporation, Mountain View, CA (US)

(72) Inventor: Fanglu Guo, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 102 days.

(21) Appl. No.: 14/585,233

(22) Filed: Dec. 30, 2014

(51) Int. Cl.
 *G06F 21/56* (2013.01)
 *G06F 21/53* (2013.01)
 *G06F 21/54* (2013.01)

(52) U.S. Cl.
 CPC ............ *G06F 21/566* (2013.01); *G06F 21/53* (2013.01); *G06F 21/54* (2013.01); *G06F 21/563* (2013.01); *G06F 2221/033* (2013.01)

(58) Field of Classification Search
 CPC .......... G06F 21/55; G06F 21/53; G06F 21/54; G06F 21/563; G06F 21/566; H04L 29/06911; H04L 29/06925; H04L 29/06931; H04L 29/06938
 See application file for complete search history.

(56) References Cited

U.S. PATENT DOCUMENTS

| | | | | | |
|---|---|---|---|---|---|
| 5,974,549 | A * | 10/1999 | Golan | ...................... | G06F 9/468 714/47.3 |
| 7,287,279 | B2 * | 10/2007 | Bertman | ............... | G06F 21/563 382/103 |
| 8,370,934 | B2 * | 2/2013 | Tsviatkou | ............. | G06F 21/566 713/187 |
| 8,413,230 | B2 * | 4/2013 | Ohta | ....................... | G06F 21/52 719/328 |
| 8,510,838 | B1 * | 8/2013 | Sun | ......................... | G06F 21/53 713/150 |
| 8,555,385 | B1 * | 10/2013 | Bhatkar | ................ | G06F 21/556 726/22 |
| 8,561,204 | B1 * | 10/2013 | Dalcher | .................. | G06F 21/60 726/27 |

(Continued)

OTHER PUBLICATIONS

"Software Guard Extensions Programming Reference", https://software.intel.com/sites/default/files/329298-001.pdf, as accessed Nov. 17, 2014, Ref. # 329298-001US, Intel Corporation, (Sep. 2013).

*Primary Examiner* — Hadi Armouche
*Assistant Examiner* — Sher A Khan
(74) *Attorney, Agent, or Firm* — Fisherbroyles LLP (57) ABSTRACT

A computer-implemented method for monitoring programs may include (1) placing a program within an enclave that includes a protected address space that code outside of the protected address space is restricted from accessing, (2) hooking an application programming interface call within the program in the enclave to monitor the behavior of the program, (3) inserting an enclave entry instruction into code outside of the protected address space that the program accesses through the hooking of the application programming interface call, and (4) monitoring the behavior of the program by executing the program within the enclave in an attempt to force the program to use the hooked application programming interface call in order to access data outside the enclave. Various other methods, systems, and computer-readable media are also disclosed.

20 Claims, 6 Drawing Sheets

(56) References Cited

U.S. PATENT DOCUMENTS

| | | | | |
|---|---|---|---|---|
| 8,874,625 | B2* | 10/2014 | Lin | G06F 17/30203 |
| | | | | 707/827 |
| 8,887,152 | B1* | 11/2014 | Chen | G06F 9/44568 |
| | | | | 717/174 |
| 8,955,124 | B2* | 2/2015 | Kim | G06F 21/566 |
| | | | | 726/23 |
| 8,990,942 | B2* | 3/2015 | Thakadu | G06F 21/52 |
| | | | | 726/23 |
| 9,092,625 | B1* | 7/2015 | Kashyap | G06F 21/566 |
| 9,117,080 | B2* | 8/2015 | Lukacs | G06F 21/53 |
| 9,330,260 | B1* | 5/2016 | Guo | G06F 21/566 |
| 9,355,246 | B1* | 5/2016 | Wan | G06F 21/566 |
| 9,419,996 | B2* | 8/2016 | Porat | G06F 21/552 |
| 2003/0061279 | A1* | 3/2003 | Llewellyn | G06F 9/542 |
| | | | | 709/203 |
| 2007/0071238 | A1* | 3/2007 | Adams | H04L 9/3247 |
| | | | | 380/46 |
| 2008/0016339 | A1* | 1/2008 | Shukla | G06F 21/53 |
| | | | | 713/164 |
| 2010/0011209 | A1* | 1/2010 | Kiriansky | G06F 21/554 |
| | | | | 713/166 |
| 2011/0179362 | A1* | 7/2011 | Craddock | H04L 51/08 |
| | | | | 715/752 |
| 2013/0047255 | A1* | 2/2013 | Dalcher | H04L 63/20 |
| | | | | 726/23 |
| 2015/0007325 | A1* | 1/2015 | Eliseev | G06F 21/566 |
| | | | | 726/24 |
| 2015/0161381 | A1* | 6/2015 | Sun | G06F 21/53 |
| | | | | 726/22 |
| 2016/0026788 | A1* | 1/2016 | Martini | G06F 9/455 |
| | | | | 726/23 |

* cited by examiner

SYSTEMS AND METHODS FOR MONITORING PROGRAMS

BACKGROUND

Individuals and organizations often seek to protect their computing resources from attackers and malicious software. To protect their computing resources, these individuals may install and use security software, including anti-malware software. The security software that individuals use to protect their computing resources may work in a variety of ways. For example, security vendors may identify malicious programs and generate digital fingerprints that uniquely identify those programs. At client computing systems, security software agents may generate digital fingerprints for newly encountered software and then compare the new digital fingerprints with the digital fingerprints known to be malicious.

To determine that a software program is malicious, the security vendors may also perform a behavioral analysis of the program's behavior. For example, the security vendors may monitor the actions and instructions that the program performs in a controlled environment on a backend server. More specifically, the security vendors may monitor particular application programming interface calls that the program makes to external operating system resources. Based on an analysis of these calls, the security vendors may more accurately categorize the program as safe or malicious. Nevertheless, as disclosed in the present application, attackers are developing techniques for bypassing the monitoring of application programming interface calls, while still performing malicious functions. For example, the programs may bypass one or more lines at the entry point of the application programming interface call, thereby avoiding hooking and monitoring of the call, as discussed further below. Accordingly, the instant disclosure identifies and addresses a need for additional and improved systems and methods for monitoring programs.

SUMMARY

As will be described in greater detail below, the instant disclosure generally relates to systems and methods for monitoring programs by, for example, placing programs under evaluation within an enclave that includes a protected address space that code outside of the protected address space is restricted from accessing. By placing the programs within the enclave, security vendors may force the programs to either use traditional application programming interface calls, which may be hooked and monitored, or else trigger an exception, which will enable the security vendors to revise the program to enable hooking and monitoring, as discussed further below.

In one example, a computer-implemented method for monitoring programs may include (1) placing a program within an enclave that includes a protected address space that code outside of the protected address space is restricted from accessing, (2) hooking an application programming interface call within the program in the enclave to monitor the behavior of the program, (3) inserting an enclave entry instruction into code outside of the protected address space that the program accesses through the hooking of the application programming interface call, and (4) monitoring the behavior of the program by executing the program within the enclave in an attempt to force the program to use the hooked application programming interface call in order to access data outside the enclave.

In some examples, executing the program may include attempting, by the program, to bypass at least one instruction at an entry point of the application programming interface call. In further examples, bypassing the instruction at the entry point of the application programming interface call further causes the program to bypass an enclave exit instruction.

In some examples, bypassing the enclave exit instruction triggers an exception. In further examples, triggering the exception invokes an exception handler that enables hooking of the application programming interface call. In one embodiment, the exception handler replaces the application programming interface call with a call to another function that includes another instance of the application programming interface call wrapped by code that hooks the application programming interface call.

In some examples, monitoring the behavior of the program may include altering the program during execution to enable further monitoring of application programming interface calls. In one embodiment, prior to inserting the enclave entry instruction, the program may already contain an enclave exit instruction.

In some examples, the computer-implemented method may further include evaluating whether the program is digitally signed. In further examples, the computer-implemented method may further include lowering a safety score for the program based on a determination that the program already contains an enclave exit instruction and a determination that the program is not digitally signed. In some examples, the computer-implemented method may further include performing static analysis to identify application programming interface calls within the program prior to executing the program within the enclave.

In one embodiment, a system for implementing the above-described method may include (1) a placement module, stored in memory, that places a program within an enclave that includes a protected address space that code outside of the protected address space is restricted from accessing, (2) a hooking module, stored in memory, that hooks an application programming interface call within the program in the enclave to monitor the behavior of the program, (3) an insertion module, stored in memory, that inserts an enclave entry instruction into code outside of the protected address space that the program accesses through the hooking of the application programming interface call, (4) a monitoring module, stored in memory, that monitors the behavior of the program by executing the program within the enclave in an attempt to force the program to use the hooked application programming interface call in order to access data outside the enclave, and (5) at least one physical processor configured to execute the placement module, the hooking module, the insertion module, and the monitoring module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) place a program within an enclave that includes a protected address space that code outside of the protected address space is restricted from accessing, (2) hook an application programming interface call within the program in the enclave to monitor the behavior of the program, (3) insert an enclave entry instruction into code outside of the protected address space that the program accesses through the hooking of the application programming interface call, and (4) monitor the behavior of the program by executing the program within the enclave in an attempt to force the program to use the hooked application programming interface call in order to access data outside the enclave.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for monitoring programs. As will be explained in greater detail below, the systems and methods herein may effectively prevent malware programs from bypassing application programming interface call monitoring. More specifically, the systems and methods herein may force the malware programs to use conventional application programming interface calls, which may be hooked and monitored, or else trigger an exception that enables security vendors to edit the programs to further enable hooking and monitoring.

Figure 1:
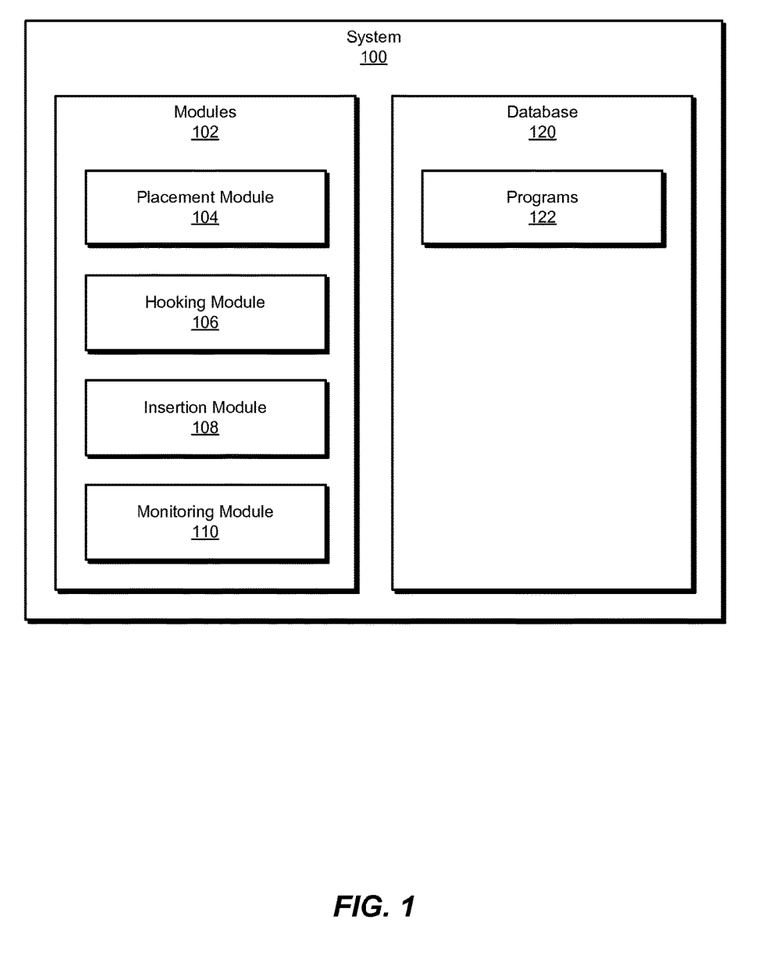
FIG. 1 is a block diagram of an exemplary system for monitoring programs.
Figure 2:
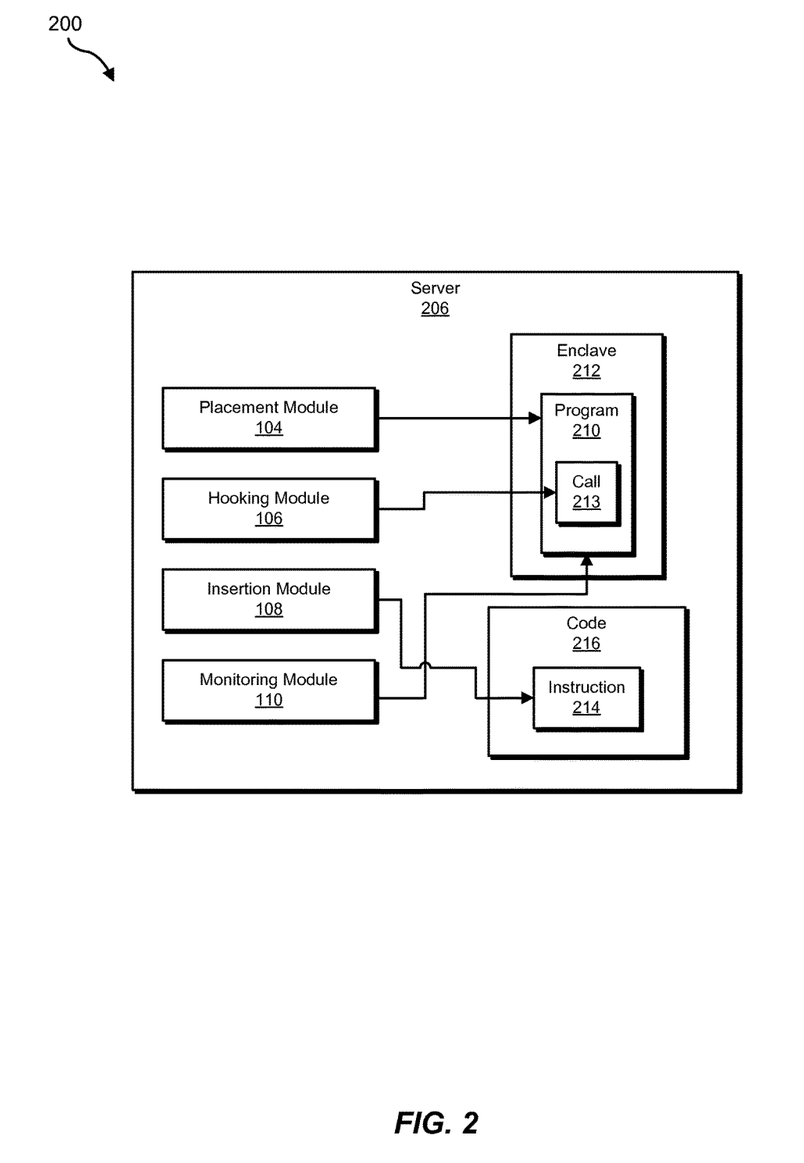
FIG. 2 is a block diagram of an additional exemplary system for monitoring programs.

The following will provide, with reference to FIGS. 1-2, detailed descriptions of exemplary systems for monitoring programs. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 5 and 6, respectively.

FIG. 1 is a block diagram of exemplary system 100 for monitoring programs. As illustrated in this figure, exemplary system 100 may include one or more modules 102 for performing one or more tasks. For example, and as will be explained in greater detail below, exemplary system 100 may also include a placement module 104 that may place a program within an enclave that includes a protected address space that code outside of the protected address space may be restricted from accessing. Exemplary system 100 may additionally include a hooking module 106 that may hook an application programming interface call within the program in the enclave to monitor the behavior of the program. Exemplary system 100 may also include an insertion module 108 that may insert an enclave entry instruction into code outside of the protected address space that the program accesses through the hooking of the application programming interface call. Exemplary system 100 may additionally include a monitoring module 110 that may monitor the behavior of the program by executing the program within the enclave in an attempt to force the program to use the hooked application programming interface call in order to access data outside the enclave. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the device illustrated in FIG. 2 (e.g., server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store programs 122, as discussed further below. Programs 122 may include newly encountered programs that are under evaluation. Similarly, programs 122 may include previously analyzed programs, which may be further categorized as either safe or malicious (or unknown). One or more of modules 102 may further generate a digital fingerprint to identify previously categorized programs, as discussed above. In some examples, security vendors may then propagate these digital fingerprints to client-side security agents to enable clients and customers to identify newly encountered programs as either safe or malicious.

Database 120 may represent portions of a single database or computing device or a plurality of databases or computing devices. For example, database 120 may represent a portion of server 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as server 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a server 206. In one example, server 206 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of server 206, enable server 206 to monitor programs. For example, and as will be described in greater detail below, placement module 104 may place a program 210 within an enclave 212 that includes a protected address space that code 216 outside of the protected address space is restricted from accessing. Hooking module 106 may hook an application programming interface call 213 within the program in enclave 212 to monitor the behavior of the program. Insertion module 108 may insert an enclave entry instruction 214 into code 216 outside of the protected address space that the program accesses through the hooking of the application programming interface call 213. Monitoring module 110 may monitor the behavior of the program by executing program 210 within enclave 212 in an attempt to force the program to use the hooked application programming interface call 213 in order to access data outside enclave 212.

Server 206 generally represents any type or form of computing device that is capable of monitoring and/or evaluating programs for potential malware behavior, as discussed further below. Examples of server 206 include, without limitation, application servers and database servers configured to provide various database services and/or run certain software applications.

Figure 3:
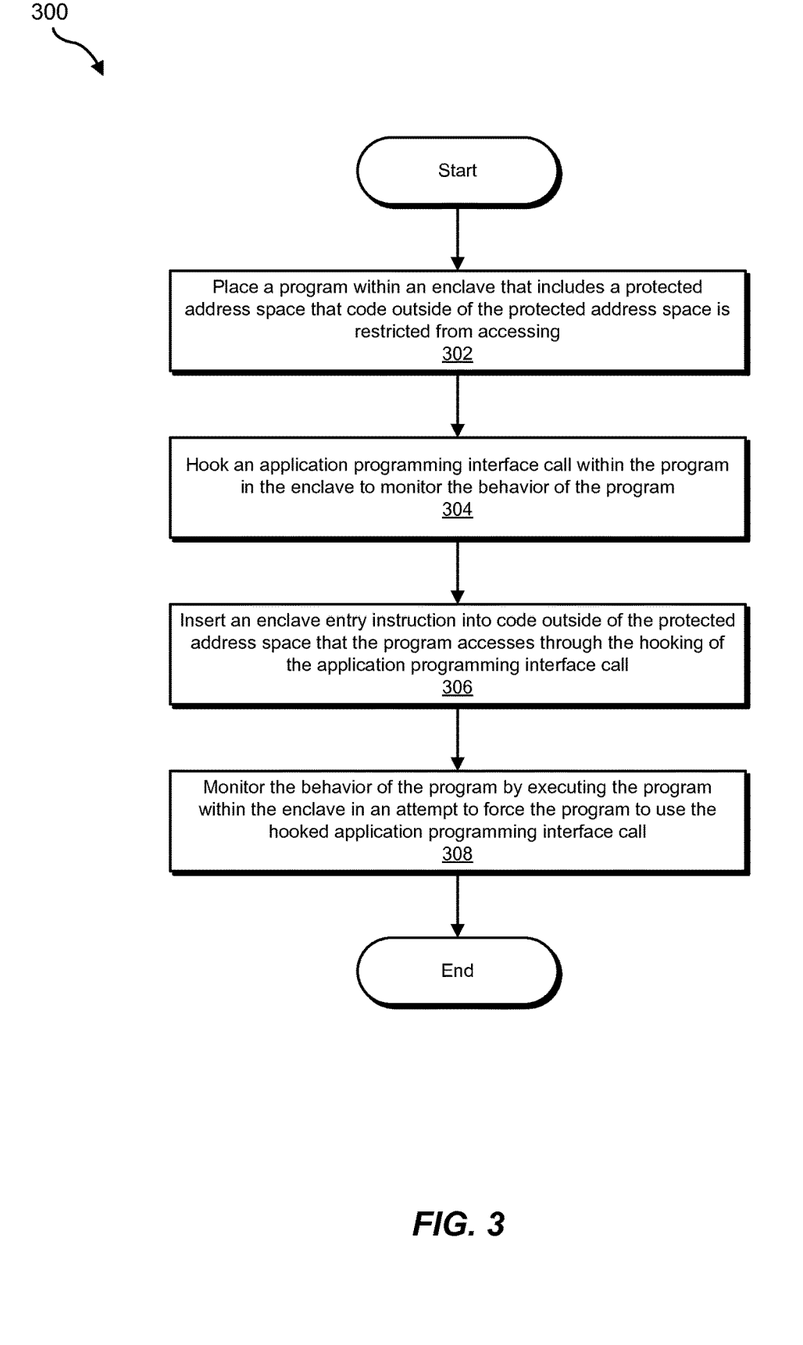
FIG. 3 is a flow diagram of an exemplary method for monitoring programs.

FIG. 3 is a flow diagram of an exemplary computer-implemented method 300 for monitoring programs. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302, one or more of the systems described herein may place a program within an enclave that includes a protected address space that code outside of the protected address space is restricted from accessing. For example, placement module 104 may, as part of server 206 in FIG. 2, place program 210 within enclave 212 that includes a protected address space that code 216 outside of the protected address space is restricted from accessing.

As used herein, the term "enclave" generally refers to a protected address space that (e.g., some, most, and/or all) code outside of the protected address space is restricted from accessing. In some examples, restricting the code from accessing the protected address space may include enabling the code to access the protected address space using only a special instruction. In some examples, the term "enclave" may refer to the SOFTWARE GUARD EXTENSION functionality and CPU instructions provided by INTEL CORPORATION.

Placement module 104 may place the program within the enclave in a variety of ways. For example, placement module 104 may create a copy of the program. Placement module 104 may then insert the copy of the program within the enclave. Similarly, in some examples, placement module 104 may revise or edit the program to enhance the evaluation of the program during execution within the enclave. In further examples, placement module 104 may use one or more special or enclave-specific CPU instructions to place the program within the enclave.

In the example of FIG. 2, placement module 104 may place program 210 within enclave 212. As further shown in FIG. 2, program 210 may further include call 213 to an external application programming interface. For example, a malware program may have limited functionality without making calls to external application programming interfaces, thereby gaining access to operating system resources. The systems and methods described herein may monitor these attempts to access operating system resources, thereby enabling the systems and methods to monitor the behavior of the program and ascertain whether the program engages in malicious functionality, as discussed further below.

At step 304, one or more of the systems described herein may hook an application programming interface call within the program in the enclave to monitor the behavior of the program. For example, hooking module 106 may, as part of server 206 in FIG. 2, hook application programming interface call 213 within program 210 in enclave 212 to monitor the behavior of the program.

Hooking module 106 may hook the application programming interface call in a variety of ways. As used herein, the phrase "hooking" generally refers to the practice of intercepting, or otherwise modifying, the functionality of a computing program to thereby arrest the function of the program and enable a security program to perform additional functionality, such as program behavior and function call analysis, as discussed further below. In some examples, hooking an application programming interface call may include triggering an exception. In further examples, hooking the application programming interface call may include redirecting function calls, modifying or replacing function calls, and/or inserting new or additional function calls and/or program code, beyond the original function calls and code of the unmodified program. Notably, as used herein, the term "hooked application programming interface call" generally refers to the modified or unmodified call command after the performance of the hooking functionality.

At step 306, one or more of the systems described herein may insert an enclave entry instruction into code outside of the protected address space that the program accesses through the hooking of the application programming interface call. For example, insertion module 108 may, as part of server 206 in FIG. 2, insert enclave entry instruction 214 into code 216 outside of the protected address space that the program accesses through the hooking of application programming interface call 213.

As used herein, the term "enclave entry instruction" generally refers to a special or enclave-specific command (e.g., a CPU instruction) that enables code outside of the enclave to gain entry inside of the enclave. Accordingly, if program 210 uses conventional calls to application programming interfaces (e.g., without skipping lines, as discussed above), such that the calls are hooked and monitored, instruction 214 may enable execution to return within the enclave after exiting the enclave and gaining access to the application programming interface, as well as corresponding operating system resources. Without executing the enclave-specific command, all code outside of the enclave may be restricted (e.g., entirely restricted) from accessing any code or data within the enclave.

Figure 4:
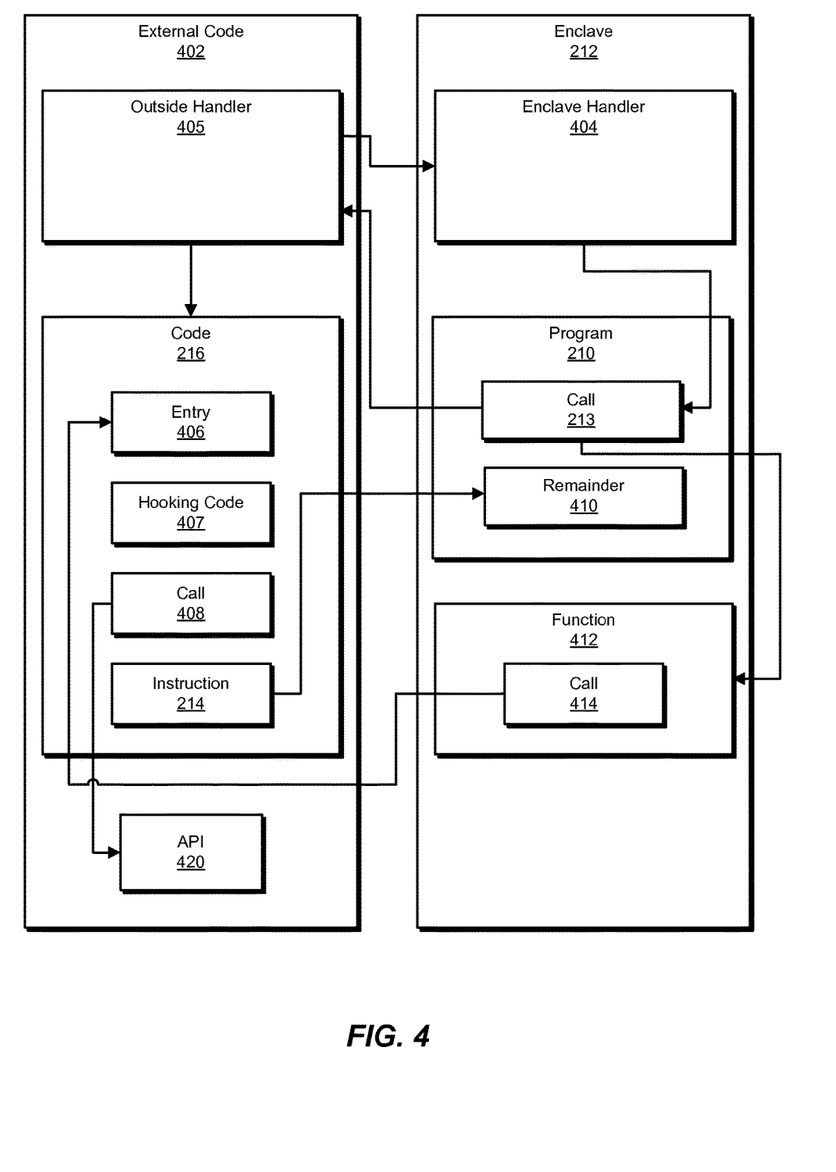
FIG. 4 is a block diagram of an exemplary enclave and exterior address space used in systems and methods for monitoring programs.

FIG. 4 shows an instance of external code 402, as well as enclave 212, which provide an illustration of the systems, methods, and techniques described herein. Notably, in some infrequent situations, call 213 to an application programming interface ("API") 420 may be the last command, or substantially last functionality, of program 210. In those cases, program analysis software may not need for execution to return to enclave 212 from external code 402. Accordingly, in those situations, step 306 may be optional, omitted, and/or replaced by insertion of an enclave exit instruction, such as a call 414, as discussed further below. Enclave exit instructions may work in a parallel manner to enclave entry instructions. Specifically, in some examples, enclave exit instructions may enable execution to exit the enclave without triggering a default.

Insertion module 108 may insert the enclave entry instruction in a variety of ways. As further shown in FIG. 4, program 210, without modification, may originally attempt to access API 420 through call 213. Instead, the attempt to call API 420 may trigger an exception, because placement module 104 placed program 210 within enclave 212. In some embodiments, attempts (e.g., all attempts) by code within enclave 212 to access data outside of enclave 212 may trigger an exception, unless the code uses a special or enclave-specific enclave exit function, as mentioned above, and as further discussed below.

Because hooking module 106 hooked call 213 to API 420, the systems and methods herein (e.g., insertion module 108) may redirect functionality of program 210 from first accessing API 420. Instead, insertion module 108 may redirect functionality of program 210 to code 216 prior to accessing API 420 through a call 408. In other words, insertion module 108 may insert code 216, including an entry 406, hooking code 407, call 408, and/or instruction 214 (e.g., an enclave entry instruction, as discussed above). Insertion module 108 may insert these items upon program 210 first triggering an exception upon an initial execution, or upon any subsequent triggering of an exception.

In one embodiment, prior to insertion module 108 inserting the enclave entry instruction, the program may already contain an enclave exit instruction. For example, within program 210, attackers may have already inserted an enclave exit instruction in an attempt to enable program 210 to exit enclave 212 without undermining the malware behavior of the program and without enabling hooking and monitoring of application programming interface calls. In these cases, security vendors and any of modules 102 may take further action to categorize program 210 as malware, potentially malware, and/or at risk for engaging in malware behavior. Specifically, in some examples, the systems and methods herein, including insertion module 108, may evaluate whether the program is digitally signed. In other words, the inclusion of enclave entry and/or exit instructions within a program should be regarded as a strong indicator that the program is at risk for engaging in malware behavior. Accordingly, to compensate for that risk, the authors and creators of these programs should digitally sign them with digital signatures that have known good reputations, thereby reassuring security vendors and others that the programs are safe despite the use of risky enclave entry and/or exit instructions. Consequently, the systems and modules herein, including insertion module 108, may lower a safety score for the program based on a determination that the program already contains an enclave exit instruction and a determination that the program is not digitally signed. In these examples, the systems and methods herein may omit one or more of steps 302-308 and/or may delete the preexisting enclave exit instruction prior to performing one or more of steps 302-308.

Returning to FIG. 3, at step 308, one or more of the systems described herein may monitor the behavior of the program by executing the program within the enclave in an attempt to force the program to use the hooked application programming interface call in order to access data outside the enclave. For example, monitoring module 110 may, as part of server 206 in FIG. 2, monitor the behavior of the program by executing program 210 within enclave 212 in an attempt to force the program to use the hooked application programming interface call 213 in order to access data outside enclave 212. As used herein, the phrase "force the program to use the hooked application programming interface call" generally refers to executing the program in a manner that triggers an exception if the program attempts to access data outside of the enclave without using a hooked application programming interface call (i.e., without the hooking having inserted enclave entry/exit instructions).

Monitoring module 110 may monitor the behavior of the program in a variety of ways. For example, monitoring module 110, and/or another one of modules 102, may perform static analysis to identify application programming interface calls within the program prior to executing the program within the enclave. During the static analysis (and/or dynamic analysis, as discussed further below), monitoring module 110 may identify call 213 to API 420. Accordingly, after identifying application programming interface calls, one or more of modules 102, such as insertion module 108, may hook call 213, such as by performing any or all of the actions that an outside handler 405 and an enclave handler 404 perform, as discussed below.

As first mentioned above, one or more of modules 102 (such as insertion module 108 and/or monitoring module 110) may monitor behavior of the program by inserting outside handler 405 within external code 402, as well as by inserting enclave handler 404 within enclave 212. FIG. 4 further shows both outside handler 405 and enclave handler 404. Outside handler 405 and/or enclave handler 404 may be invoked upon the triggering of an exception, such as an exception triggered by program 210. Outside handler 405 may insert code 216, entry 406, hooking code 407, call 408, and/or instruction 214 within external code 402. Instruction 214 may return execution to within enclave 212, beginning for example at a remainder 410 of program 210. Similarly, enclave handler 404 may insert a function 412 and call 414 within enclave 212, while also modifying and/or redirecting call 213, as discussed below. In some embodiments, the triggering of the exception may first invoke outside handler 405 followed by enclave handler 404.

In some examples, program 210 may attempt to bypass at least one instruction at an entry point of the application programming interface call. For example, instead of jumping to a first line or command of API 420, program 210 may attempt to jump to a second or subsequent line or command, while still obtaining all or substantially all of the functionality of API 420. In further examples, attempting to bypass the instruction at the entry point of the application programming interface call further causes the program to bypass an enclave exit instruction. For example, during a process of outside handler 405 and enclave handler 404 hooking call 213 (e.g., by replacing call 213 to API 420 with a call to function 412 and/or a call to entry 406, which may be inserted by insertion module 108 and/or enclave handler 404), insertion module 108 may insert an enclave exit instruction, such as call 414, that jumps to entry 406 instead of calling API 420 directly. Accordingly, if program 210 attempts to call API 420 directly, while bypassing an entry point of API 420 and/or bypassing hooking of the call to API 420, program 210 will also effectively, or necessarily, bypass the enclave exit instruction (e.g., call 414). In other words, prior to hooking, the unmodified call 213 to external code 402, without using an enclave exit instruction (such as call 414), will trigger an exception. Moreover, triggering the exception will further invoke outside handler 405 and/or enclave handler 404, as mentioned above, and as discussed further below.

In some embodiments, enclave handler 404 may replace the application programming interface call (e.g., call 213) with a call to another function (e.g., function 412 and/or code 216) that invokes (directly or indirectly) another instance of the application programming interface call (e.g., call 408) wrapped by code (e.g., hooking code 407) that hooks the application programming interface call. In other words, enclave handler 404 may replace or modify call 213 with another call that calls an additional function that directly, or indirectly, calls API 420 while enabling hooking and monitoring of the application programming interface call. In general, monitoring module 110 may monitor the behavior of the program by altering the program during execution to enable further monitoring of application programming interface calls, as discussed above regarding the functioning of outside handler 405 and/or enclave handler 404.

In view of the above, the systems and methods described herein may force a dilemma upon attackers and the authors of malicious software. First, the attackers may attempt to bypass hooking and monitoring of application programming interface calls by skipping conventional and hooked calls, thereby triggering exceptions that prevent the program from successfully completing while enabling security software to revise the program to enable further hooking and monitoring. Second, alternatively, the attackers may simply use conventional and hooked calls, which ensures that the security vendors, and the analyses performed by their backend servers, will be able to identify the application programming interface calls and analyze the behavior of the program. In this manner, security vendors may repeatedly execute programs within an enclave, thereby triggering an exception, revise the code to hook the application programming interface call for the triggered exception, and repeat this process until the program executes without any exceptions and all API calls are hooked and monitored.

In other words, the systems and methods described herein prevent attackers and authors of malicious software from successfully engaging in malware functionality while also avoiding the hooking, monitoring, and analyzing of the malware functionality. Moreover, by analyzing which specific application programming interface calls the program makes, software vendors, and their security analysis software, may identify what operating system resources the program is attempting to access. Some of these resources, such as a text file, may be relatively innocuous and benign. Other resources, such as a registry entry that specifies security settings for the operating system and/or administrator or user privileges, may be known as sensitive and high-value resources that are likely targets of malware software. Similarly, security vendors, and/or their security analysis software, may associate (based on frequencies derived from previously classified safe and malicious software) different application programming interface calls and/or operating system resources with varying levels of suspicion, sensitivity, and/or association with malware activity.

As described above, the instant disclosure generally relates to systems and methods for monitoring programs by, for example, placing programs under evaluation within an enclave that includes a protected address space that code outside of the protected address space is restricted from accessing. By placing the programs within the enclave, security vendors may force the programs to either use traditional application programming interface calls, which may be hooked and monitored, or else trigger an exception, which will enable the security vendors to revise the program to enable hooking and monitoring, as discussed further above.

Figure 5:
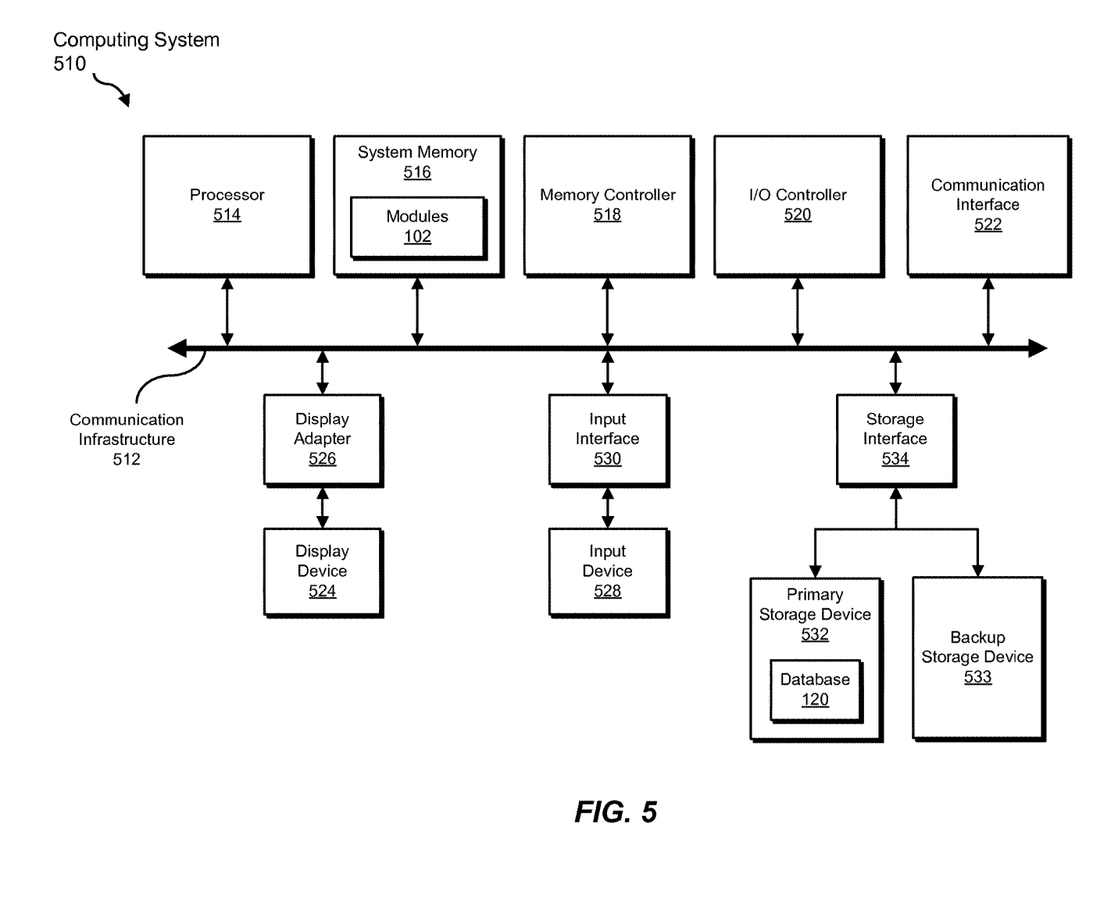
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
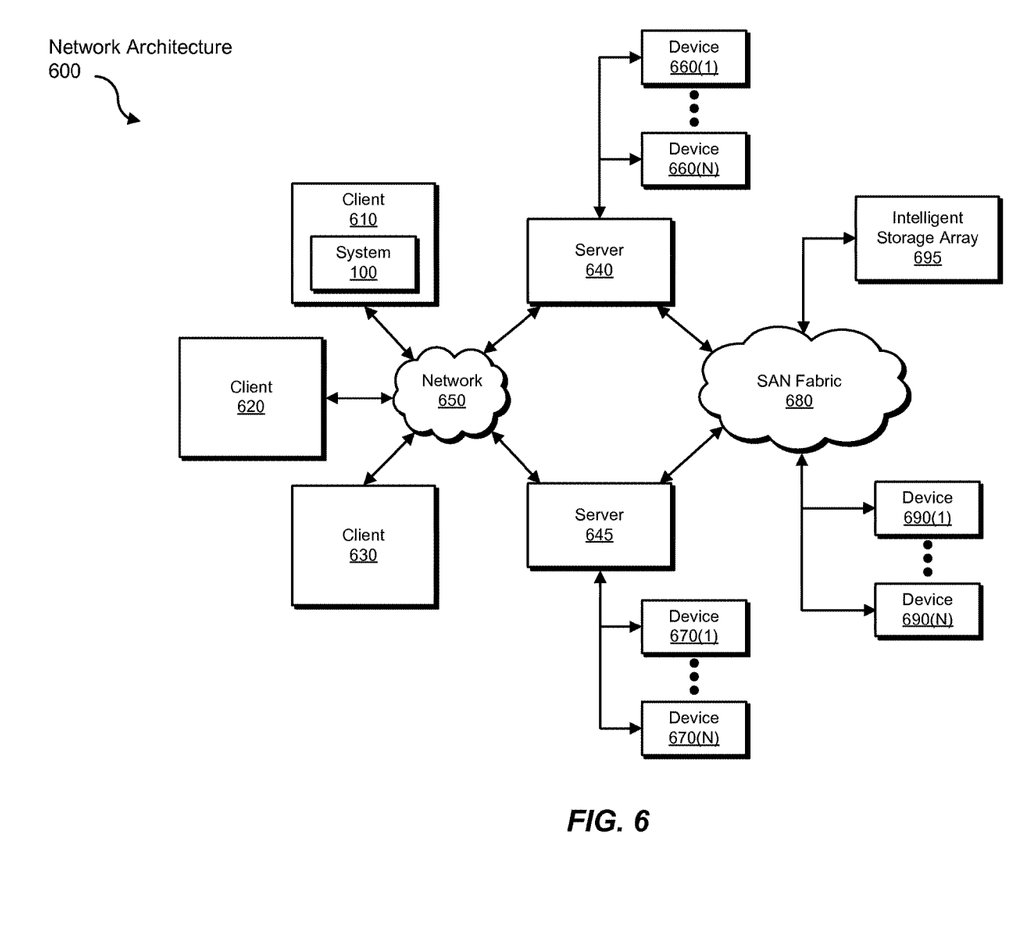
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for monitoring programs.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a program and/or security setting to be transformed, transform the program and/or setting based on a malware analysis of the program (e.g., by placing the program within an enclave and/or modifying the program or external code, as discussed above, to facilitate the malware analysis), output a result of the transformation to a security database and/or backend server, use the result of the transformation to identify malware and/or protect end-users from malware, and store the result of the transformation to a database, output device, and/or display. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for monitoring programs, at least a portion of the method being performed by a computing device comprising at least one processor, the method comprising:

placing a program within an enclave to perform a security analysis of the program to ascertain whether the program engages in malicious functionality, the enclave comprising a protected address space that code outside of the protected address space is restricted from accessing except through a special central processing unit enclave entry instruction;

hooking an application programming interface call within the program in the enclave to monitor the behavior of the program;

inserting the enclave entry instruction into code outside of the protected address space that the program accesses through the hooking of the application programming interface call; and monitoring the behavior of the program by executing the program within the enclave in an attempt to force the program to use the hooked application programming interface call in order to access data outside the enclave, wherein:

executing the program comprises attempting, by the program, to bypass at least one instruction at an entry point of the application programming interface call; and bypassing the instruction at the entry point of the application programming interface call further causes the program to bypass an enclave exit instruction and trigger an exception that enables revision of the program to perform further hooking and monitoring as part of the security analysis of the program to ascertain whether the program engages in malicious functionality.

2. The computer-implemented method of claim 1, wherein the application programming interface call provides access to operating system resources.

3. The computer-implemented method of claim 2, further comprising analyzing which specific application programming interface calls the program makes to identify what operating system resources the program is attempting to access.

4. The computer-implemented method of claim 1, wherein hooking the application programming interface call comprises at least one of:

redirecting a function call;
modifying a function call; and
inserting an additional function call.

5. The computer-implemented method of claim 1, wherein triggering the exception invokes an exception handler that enables hooking of the application programming interface call.

6. The computer-implemented method of claim 5, wherein the exception handler replaces the application programming interface call with a call to another function that invokes another instance of the application programming interface call wrapped by code that hooks the application programming interface call.

7. The computer-implemented method of claim 1, wherein monitoring the behavior of the program comprises altering the program during execution to enable further monitoring of application programming interface calls.

8. The computer-implemented method of claim 1, wherein, prior to inserting the enclave entry instruction, the program already contains an enclave exit instruction.

9. The computer-implemented method of claim 8, further comprising evaluating whether the program is digitally signed.

10. The computer-implemented method of claim 9, further comprising lowering a safety score for the program based on a determination that the program already contains an enclave exit instruction and a determination that the program is not digitally signed.

11. The computer-implemented method of claim 1, further comprising performing static analysis to identify application programming interface calls within the program prior to executing the program within the enclave.

12. A system for monitoring programs, the system comprising:

a placement module, stored in memory, that places a program within an enclave to perform a security analysis of the program to ascertain whether the program engages in malicious functionality, the enclave comprising a protected address space that code outside of the protected address space is restricted from accessing except through a special central processing unit enclave entry instruction;

a hooking module, stored in memory, that hooks an application programming interface call within the program in the enclave to monitor the behavior of the program;

an insertion module, stored in memory, that inserts the enclave entry instruction into code outside of the protected address space that the program accesses through the hooking of the application programming interface call;

a monitoring module, stored in memory, that monitors the behavior of the program by executing the program within the enclave in an attempt to force the program to use the hooked application programming interface call in order to access data outside the enclave; and at least one physical processor configured to execute the placement module, the hooking module, the insertion module, and the monitoring module, wherein:

the monitoring module detects whether the program attempts to bypass at least one instruction at an entry point of the application programming interface call; and the monitoring module detects whether the program bypasses an enclave exit instruction and triggers an exception that enables revision of the program to perform further hooking and monitoring as part of the security analysis of the program to ascertain whether the program engages in malicious functionality.

13. The system of claim 12, wherein the application programming interface call provides access to operating system resources.

14. The system of claim 13, wherein the monitoring module analyzes which specific application programming interface calls the program makes to identify what operating system resources the program is attempting to access.

15. The system of claim 12, wherein the hooking module hooks the application programming interface call by performing at least one of:

redirecting a function call;
modifying a function call; and
inserting an additional function call.

16. The system of claim 12, wherein triggering the exception invokes an exception handler that enables hooking of the application programming interface call.

17. The system of claim 16, wherein the exception handler is configured to replace the application programming interface call with a call to another function that invokes another instance of the application programming interface call wrapped by code that hooks the application programming interface call.

18. The system of claim 12, wherein the monitoring module monitors the behavior of the program by altering the program during execution to enable further monitoring of application programming interface calls.

19. The system of claim 12, wherein the insertion module is configured to determine whether the program already contains an enclave exit instruction prior to inserting the enclave entry instruction.

20. A non-transitory computer-readable medium comprising one or more computer-readable instructions that, when executed by at least one processor of a computing device, cause the computing device to:

place a program within an enclave to perform a security analysis of the program to ascertain whether the program engages in malicious functionality, the enclave comprising a protected address space that code outside of the protected address space is restricted from accessing except through a special central processing unit enclave entry instruction;

hook an application programming interface call within the program in the enclave to monitor the behavior of the program;

insert the enclave entry instruction into code outside of the protected address space that the program accesses through the hooking of the application programming interface call; and monitor the behavior of the program by executing the program within the enclave in an attempt to force the program to use the hooked application programming interface call in order to access data outside the enclave, wherein:

executing the program comprises attempting, by the program, to bypass at least one instruction at an entry point of the application programming interface call; and bypassing the instruction at the entry point of the application programming interface call further causes the program to bypass an enclave exit instruction and trigger an exception that enables revision of the program to perform further hooking and monitoring as part of the security analysis of the program to ascertain whether the program engages in malicious functionality.

* * * * *